(12) United States Patent
Nicolas (10) Patent No.: US 9,639,919 B2
(45) Date of Patent: May 2, 2017

(54) DETECTION AND CORRECTION OF ARTEFACTS IN IMAGES OR VIDEO

(71) Applicant: STMicroelectronics (Grenoble 2) SAS, Grenoble (FR)

(72) Inventor: Marina Nicolas, Voreppe (FR)

(73) Assignee: STMicroelectronics (Grenoble 2) SAS, Grenoble (FR)

(*) Notice: Subject to any disclaimer, the term of this patent is extended or adjusted under 35 U.S.C. 154(b) by 0 days.

(21) Appl. No.: 14/863,993

(22) Filed: Sep. 24, 2015

(65) Prior Publication Data

US 2016/0098822 A1 Apr. 7, 2016

(30) Foreign Application Priority Data

Oct. 7, 2014 (FR) ...................................... 14 59582

(51) Int. Cl.
*G06T 5/00* (2006.01)
*G06T 7/00* (2017.01)
(Continued)

(52) U.S. Cl.
CPC ............ *G06T 5/002* (2013.01); *G06T 7/0002* (2013.01); *H04N 19/117* (2014.11); *H04N 19/14* (2014.11);
(Continued)

(58) Field of Classification Search
CPC . G06T 2207/20021; G06T 2207/20172; G06T 2207/30168; G06T 5/001;
(Continued)

(56) References Cited

U.S. PATENT DOCUMENTS

2002/0075972 A1* 6/2002 Richards .............. H04B 1/0003
375/324
2004/0081368 A1* 4/2004 Mathew ................. H04N 19/86
382/268

(Continued)

OTHER PUBLICATIONS

International Telecommunication Union, "Series H: Audiovisual and Multimedia Systems—Infrastructure of audiovisual services—Coding of moving video, Advanced video coding for generic audiovisual services," ITU-T H.264, Telecommunication Standardization Sector of ITU, Feb. 2014, 790 pages.

(Continued)

*Primary Examiner* — Jingge Wu
(74) *Attorney, Agent, or Firm* — Seed IP Law Group LLP (57) ABSTRACT

A method involving: detecting in an image a first type of artifact (A1) to generate a first artifact value ($G_{A1}$) and a first confidence level ($C_{A1}$); detecting in the image a second type of artifact (A2) to generate a second artifact value ($G_{A2}$) and a second confidence level ($C_{A2}$); and performing correction of the first type of artifact (A1) in the image based on the first and second artifact values ($G_{A1}$, $G_{A2}$) and the relative values of the first and second confidence levels ($C_{A1}$, $C_{A2}$).

28 Claims, 3 Drawing Sheets

(51) Int. Cl.
*H04N 19/176* (2014.01)
*H04N 19/117* (2014.01)
*H04N 19/86* (2014.01)
*H04N 19/14* (2014.01)

(52) U.S. Cl.
CPC ........... *H04N 19/176* (2014.11); *H04N 19/86* (2014.11); *G06T 2207/10004* (2013.01); *G06T 2207/10016* (2013.01); *G06T 2207/20004* (2013.01); *G06T 2207/20021* (2013.01); *G06T 2207/20076* (2013.01); *G06T 2207/20172* (2013.01); *G06T 2207/30168* (2013.01)

(58) Field of Classification Search
CPC ..... G06T 5/002; G06T 7/0002; H04N 19/117; H04N 19/154; H04N 19/176; H04N 19/86
See application file for complete search history.

(56) References Cited

U.S. PATENT DOCUMENTS

| | | | |
|---|---|---|---|
| 2005/0271287 A1* | 12/2005 | Lesellier | H04N 19/527 382/236 |
| 2006/0039593 A1* | 2/2006 | Sammak | G06K 9/00127 382/133 |
| 2009/0180026 A1* | 7/2009 | Tang | H04N 19/176 348/607 |
| 2009/0220168 A1 | 9/2009 | Yamajo et al. | |
| 2009/0304278 A1 | 12/2009 | Steinberg et al. | |
| 2010/0046623 A1* | 2/2010 | Chen | H04N 7/01 375/240.16 |
| 2010/0060749 A1 | 3/2010 | Srinivasan et al. | |
| 2010/0260271 A1 | 10/2010 | Kapoor | |
| 2011/0019093 A1* | 1/2011 | Zhong | H04N 5/144 348/607 |
| 2012/0051614 A1* | 3/2012 | Olszewski | G06T 7/0002 382/128 |
| 2012/0313937 A1* | 12/2012 | Beeler | G06T 19/00 345/419 |
| 2014/0006094 A1* | 1/2014 | Doran | G06Q 10/10 705/7.28 |
| 2015/0110399 A1* | 4/2015 | Valdes Lopez | H04N 1/4074 382/167 |
| 2015/0193632 A1* | 7/2015 | Golac | G06F 21/62 726/1 |

OTHER PUBLICATIONS

Crete et al., "The Blur Effect: Perception and Estimation with a New No-Reference Perceptual Blur Metric," SPIE Electronic Imaging Symposium Conference Human Vision and Electronic Imaging XII, San Jose, CA, Jan. 28, 2007, 11 pages.

Muijs et al., "A No-Reference Blocking Artifact Measure for Adaptive Video Processing," 13th European Signal Processing Conference, 2005, 4 pages.

Shaked et al., "Sharpness Measure: Towards Automatic Image Enhancement," IEEE, 2005, 4 pages.

Shaked et al., "Sharpness Measure: Towards Automatic Image Enhancement," HP Laboratories Israel, HPL-2004-84(R.2), Jun. 10, 2005, 10 pages.

* cited by examiner

DETECTION AND CORRECTION OF ARTEFACTS IN IMAGES OR VIDEO

BACKGROUND

Technical Field

The present disclosure relates to a method and a device for performing artefact correction, and in particular a method and device for the detection and correction of artefacts in still or video images.

Description of the Related Art

Compression standards used to compress still images or video generally introduce artefacts. For example, compression standards include JPEG compression for images and MPEG compression for video, and compression artefacts include blocking, ringing, blurring, banding, and mosquito noise, among others. As compression standards advance, the list of artefacts has been increasing.

In order to improve the image quality, artefact correction filters can be applied to the decompressed images in order to remove specific artefacts. However, a difficulty is that at least some of these artefact correction filters may reduce the image quality if the corresponding artefact is in fact not present in the image. While it has been proposed to implement detection algorithms associated with each artefact prior to performing the corresponding artefact correction, such detection algorithms tend to be complex, and demanding in processing resources and chip area. Furthermore, the artefact correction filters are targeting ever more subtle artefacts, meaning that their complexity is increasing faster than the visual benefit that they provide.

BRIEF SUMMARY

In an embodiment, a method comprises: detecting in one or more images a first type of artefact to generate a first artefact value and a first confidence level associated with the first type of artefact; detecting in the one or more images a second type of artefact to generate a second artefact value and a second confidence level associated with the second type of artefact; and performing correction of the first type of artefact in the one or more images based on the first and second artefact values and the relative values of the first and second confidence levels. The first and second confidence levels for example each indicate a level of confidence of the presence of the first and second artefact values respectively in the one or more images.

In an embodiment, the method comprises performing correction of the second type of artefact in the one or more images based on the first and second artefact values and the relative values of the first and second confidence levels.

In an embodiment, performing correction of the first type of artefact comprises: comparing the first and second confidence levels; if the second confidence level is greater than the first confidence level, modifying the first artefact value based on the second artefact value and performing correction of the first type of artefact based on the modified first artefact value; and if the first confidence level is greater than the second confidence level, performing correction of the first type of artefact based on the first artefact value.

In an embodiment, the first and second artefact values are gain values, and performing correction of the first type of artefact comprises: modifying the first artefact gain value based on the second artefact gain value and the relative values of the first and second confidence levels; and applying the modified first gain value during an artefact correction process.

In an embodiment, the modified first artefact gain value is determined based on one of the following equations:

$$G_{A1}=G_{A1}+I_{Factor}*(G_{A2}-G_{A1}); \text{ and}$$

$$G_{A1}=G_{A1}+I_{Factor}*(1-G_{A2}-G_{A1})$$

where $G_{A1}$ and $G_{A2}$ are normalized first and second gain values and $I_{Factor}$ is an influence factor determined based on the following equation:

$$I_{Factor}=\frac{1}{2}*(C_{A2}-C_{A1})/(C_{A2}+C_{A1})$$

where $C_{A1}$ is the first confidence level and $C_{A2}$ is the second confidence level and wherein $I_{Factor}$ is limited to positive values.

In an embodiment, the first artefact type is blocking, and the second artefact type is one of ringing, blurring, mosquito noise, banding, color blobs and missing blocks.

In an embodiment, detecting the level of the first artefact type comprises: determining pixel gradients between neighboring pixels across the whole image; and comparing pixels gradients of a first line of pixels with an average pixel gradient of neighboring lines of pixels.

In an embodiment, the first confidence level is generated based on the density of artefacts detected in the one or more images.

In an embodiment, the artefact is a compression artefact.

In an embodiment, the one or more images are part of an image sequence, and at least one of the first and second types of artefacts is a video compression artefact.

In an embodiment, a non-transitory storage device comprises instructions that, when executed by a processing device, cause an embodiment of a method disclosed herein to be implemented.

In an embodiment, an image correction device comprises: a processing device; one or more memory devices storing one or more images and one or more instructions executable by the processing device that cause the processing device to: detect in the one or more images a first type of artefact and generate a first artefact value and a first confidence level associated with the first type of artefact; detect in the one or more images a second type of artefact and generate a second artefact value and a second confidence level associated with the second type of artefact; and perform correction of the first type of artefact in the one or more images based on the first and second artefact values and the relative values of the first and second confidence levels.

In an embodiment, a device comprises: one or more memories; image processing circuitry configured to: generate a first artefact value and a first confidence level associated with a first type of artefact in an image; generate a second artefact value and a second confidence level associated with a second type of artefact in an image; and perform correction of the first type of artefact in the image based on the first and second artefact values and relative values of the first and second confidence levels. In an embodiment, the image processing circuitry is configured to perform correction of the second type of artefact in the image based on the first and second artefact values and the relative values of the first and second confidence levels. In an embodiment, the image processing circuitry is configured to perform correction of the first type of artefact by: comparing the first and second confidence levels; if the second confidence level is greater than the first confidence level, modifying the first artefact value based on the second artefact value and performing correction of the first type of artefact based on the modified first artefact value; and if the first confidence level is greater than the second confidence level, performing correction of the first type of artefact based on the first artefact value. In an embodiment, the first and second artefact values are gain values, and performing correction of the first type of artefact comprises: modifying the first artefact gain value based on the second artefact gain value and the relative values of the first and second confidence levels; and applying the modified first gain value during an artefact correction process. In an embodiment, the modified first artefact gain value is determined based on one of the following equations:

$$G_{A1}=G_{A1}+I_{Factor}*(G_{A2}-G_{A1}); \text{ and}$$

$$G_{A1}=G_{A1}+I_{Factor}*(1-G_{A2}-G_{A1})$$

where $G_{A1}$ and $G_{A2}$ are normalized first and second gain values and $I_{Factor}$ is an influence factor determined based on the following equation:

$$I_{Factor}=\tfrac{1}{2}*(C_{A2}-C_{A1})/(C_{A2}+C_{A1})$$

where $C_{A1}$ is the first confidence level and $C_{A2}$ is the second confidence level and wherein $I_{Factor}$ is limited to positive values.

In an embodiment, the image processing circuitry is configured to generate the level of confidence of the first artefact type by: determining pixel gradients between neighboring pixels across the whole image; and comparing pixels gradients of a first line of pixels with an average pixel gradient of neighboring lines of pixels. In an embodiment, the image processing circuitry is configured to generate the first confidence level based on a density of artefacts detected in the images. In an embodiment, the image processing circuitry is configured to processes one or more images of an image sequence.

In an embodiment, a non-transitory computer-readable medium's contents configure an image processing device to perform a method, the method comprising: generating a first artefact value and a first confidence level associated with a first type of artefact in one or more images; generating a second artefact value and a second confidence level associated with a second type of artefact in the one or more image; and performing correction of the first type of artefact in the one or more images based on the first and second artefact values and relative values of the first and second confidence levels. In an embodiment, the method comprises performing correction of the second type of artefact in the one or more images based on the first and second artefact values and the relative values of the first and second confidence levels. In an embodiment, the method comprises performing correction of the first type of artefact by: comparing the first and second confidence levels; if the second confidence level is greater than the first confidence level, modifying the first artefact value based on the second artefact value and performing correction of the first type of artefact based on the modified first artefact value; and if the first confidence level is greater than the second confidence level, performing correction of the first type of artefact based on the first artefact value.

In an embodiment, a system comprises: an image memory; an image display; and image processing circuitry configured to: generate a first artefact value and a first confidence level associated with a first type of artefact in one or more images; generate a second artefact value and a second confidence level associated with a second type of artefact in the one or more images; and perform correction of the first type of artefact in the one or more images based on the first and second artefact values and relative values of the first and second confidence levels. In an embodiment, the system comprises an instruction memory, wherein the image processing circuitry includes a processor configured to execute instructions stored in the instruction memory. In an embodiment, the system comprises an image sensor.

BRIEF DESCRIPTION OF THE SEVERAL VIEWS OF THE DRAWINGS

The following detailed description of embodiments, is given by way of illustration and not limitation with reference to the accompanying drawings, in which.

DETAILED DESCRIPTION

While in the following description the particular encoding standards used to compress the images have not been described in detail, it will be apparent to those skilled in the art that the embodiments described herein could be applied to a wide range of compression standards for still images or video, such as the JPEG (Joint Photographic Experts Group) standard, the H.264 ISO standard MPEG4 AVC, the MPEG-2 video standard, the VP8 and VP9 standard, or the MPEG HEVC (High Efficiency Video Coding) standard.

Figure 1:
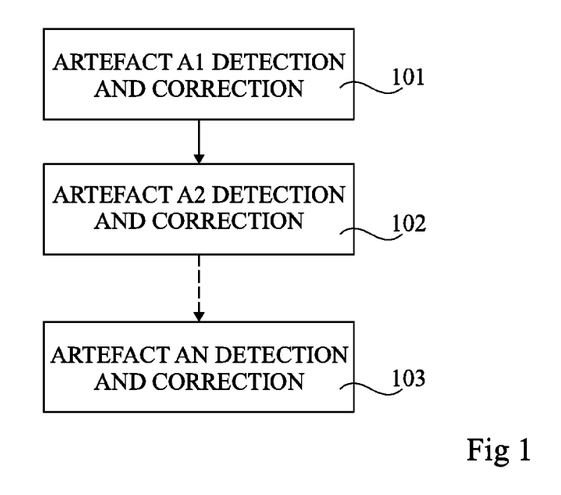
FIG. 1 is a flow diagram illustrating operations in a method of artefact detection and correction according to a solution that has been proposed.

FIG. 1 illustrates operations in a method that has been proposed for detecting and correcting artefacts in images.

In a first operation 101, a first type of artefact A1 in an image is detected by a specific algorithm, and then corrected.

In a subsequent operation 102, a second type of artefact A2 in the image is detected by a specific algorithm, and then corrected.

The method then continues with the detection and correction of one or more further artefacts in the image, up to a final Nth artefact AN in an operation 103. Each of the artefacts A1 to AN for example correspond to one of blocking, ringing, blurring, etc.

The artefact detection applied in each of the operations 101 to 103 for example involves computing a gain level controlled by a global, frame-based artefact measurement, and setting the aggressiveness of the artefact correction based on this gain level. Computing such a gain level and performing artefact correction based on such a gain level is well known in the art. For example, such techniques are described in more detail in the publication by R. Mujis and I. Kirenko, entitled "A no reference blocking artifact measure for adaptive video processing", Proceedings of the 13th European Signal Processing Conference (EUSIPCO '05) 2005, and in the publication by Doron Shaked and Ingeborg Tastl entitled "Sharpness Measure: Towards Automatic Image Enhancement", HP Laboratories, a shorter version of this paper being published as ICIP 2005, IEEE International Conference on Image Processing, volume 1, pages 1-937-940.

According to the method of FIG. 1, each artefact detection method is implemented independently of the others. A drawback of this method is that, in order to provide a reasonably accurate measure of a given artefact in the image, the artefact detection algorithms tend to be complex, and thus relatively costly in terms of processing resources and chip area.

Figure 2:
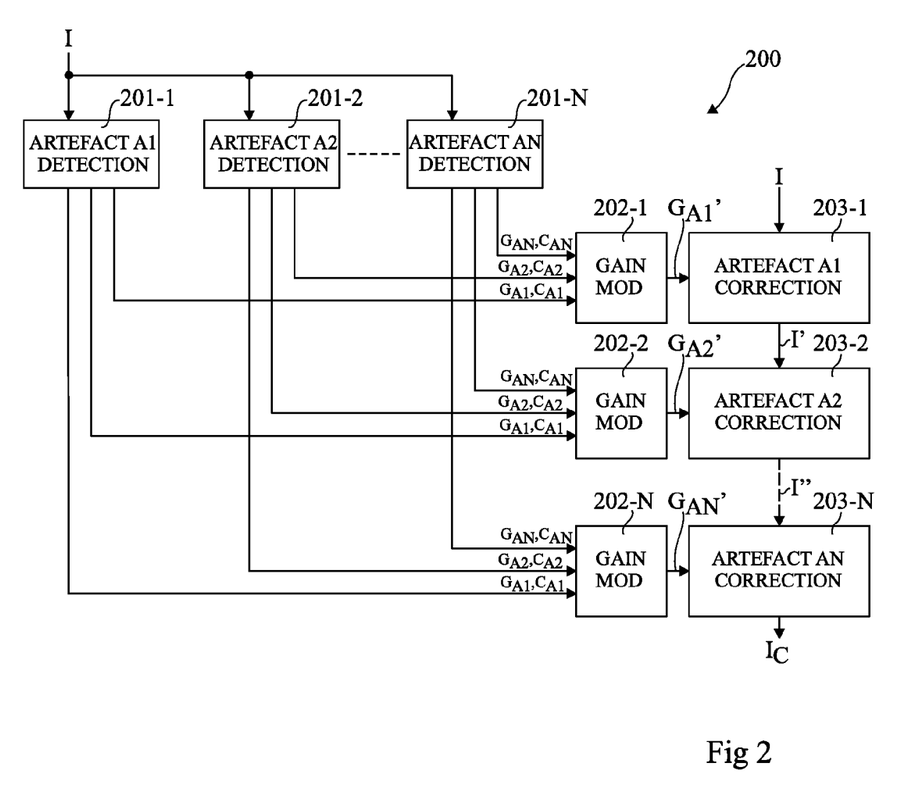
FIG. 2 is a block diagram illustrating functional elements in an image processing device for detecting and correcting artefacts according to an example embodiment of the present disclosure.

FIG. 2 is a block diagram illustrating functional elements in a system for detecting and correcting artefacts in still or video images according to an example embodiment of the present disclosure. The system of FIG. 2 may be implemented entirely by software executed by a suitable processing device, or in some embodiments it may at least partially be implemented in hardware. For example, the system could be implemented using one or more processors, one or more image processing devices, discrete circuitry, one or state machines, etc., and various combinations thereof.

A detection block 201-1 receives one or more input images I, which could be a single still image or one or more images forming part of a video sequence, and detects the presence of a first type of artefact A1. For example, the one or more images have for example been generated by decompressing a compressed still image or video stream, potentially leading to one or more types of compression artefacts. Additionally or alternatively, the artefact may result from another source. For example, artefacts may result from movement compensation, multi-exposure, or deinterlacing. The term "artefact" is used herein to designate a broad range of compression and non-compression types of image or video artefacts.

The detection block 201-1 for example generates a gain value $G_{A1}$ associated with the artefact A1 and a confidence level $C_{A1}$ representing the level of confidence associated with the presence of the artefact A1. The gain level for example indicates how aggressive the artefact correction is to be. The confidence level is for example generated based on the density of artefacts detected in the one or more images.

A detection block 201-2 also receives the one or more input images I, and detects the presence of a second type of artefact A2. The detection block 201-2 for example generates a gain value $G_{A2}$ associated with the artefact A2 and a confidence level $C_{A2}$ representing the level of confidence associated with the presence of the artefact A2.

One or more further detection blocks are also for example provided for the detection of further artefacts in the one or more input images I, up to a block 201-N for detecting an Nth artefact AN, where N is for example equal to 2 or more. The detection block 201-N for example generates a gain value $G_{AN}$ associated with the artefact AN and a confidence level $C_{AN}$ representing the level of confidence associated with the presence of the artefact AN. The detection performed by the blocks 201-1 to 201-N may be performed in series, or at least partially in parallel.

For example, the generation of the artefact gain levels $G_{A1}$ to $G_{AN}$ based on artefact detection is performed by a global, frame-based artefact measurement as described in the above-referenced publications by Mujis et al. and by Shaked et al.

A gain modification block 202-1 for example computes a modified gain value $G_{A1}'$ to be applied during correction of the artefact A1, based on at least the gain value $G_{A1}$ and confidence level $C_{A1}$ from block 201-1, and on the artefact gain value and confidence level determined for at least one other type of artefact. A correction block 203-1 receives the one or more input images I and the modified gain value $G_{A1}'$ from the block 202-1, and performs correction of the artefact A1 based on the modified gain value $G_{A1}'$. For example, the artefact correction based on the modified gain value $G_{A1}'$ is performed as described in the above-referenced publications by Mujis et al. and by Shaked et al.

A gain modification block 202-2 for example computes a modified gain value $G_{A2}'$ to be applied during correction of the artefact A2, based on at least the gain value $G_{A2}$ and confidence level $C_{A2}$ from block 201-2, and on the artefact gain value and confidence level determined for at least one other type of artefact. A correction block 203-2 receives the corrected one or more images I' from the block 203-1 and the modified gain value $G_{A2}'$ from the block 202-2, and performs correction of the artefact A2 based on the modified gain value $G_{A2}'$. For example, the artefact correction based on the modified gain value $G_{A2}'$ is performed as described in the above-referenced publications by Mujis et al. and by Shaked et al.

Similarly, one or more further gain modification blocks, up to an Nth block 202-N, generate modified gain values. These gain values are applied by one or more further artefact correction blocks, up to a block 203-N, on one or more images I" provided by the block 203-(N−1) to provide a corrected image $I_C$. For example, the artefact correction based on the modified gain value $G_{AN}'$ is performed as described in the above-referenced publications by Mujis et al. and by Shaked et al. In the example of FIG. 2, the gain modification blocks 202-1 to 202-N each receive the levels generated by each of the detection blocks 201-1 to 201-N, but in some embodiments, at least some of the modification blocks may receive only the gain values and confidence levels relating to two or more artefact types, instead of receiving all of the gain and confidence values.

In some embodiments, the gain levels $G_{A1}$ to $G_{AN}$ are generated on a same scale and/or normalized such that they can be compared in a meaningful way. For example, the gain values are generated by detecting the levels of the different types of artefact, and normalizing these levels with respect to each other, prior to calculating the modified gain values. For example, a technique for normalizing the artefact levels is to perform subjective testing for each artefact to determine the lowest level of the artefact for which the presence of the artefact is just noticeable, and the highest level of the artefact above which the artefact is no longer getting worse. The lowest level of each artefact is for example assigned a same artefact level, such as 0, and the highest level of each artefact is for example assigned a same artefact level, such as 100, and the intermediate levels are assigned, in a linear fashion, values between the lowest and highest artefact level based on the detected artefact level. Each artefact level is for example determined on this scale, such that it can be compared to the other artefact levels. For example, such a technique for normalizing the artefact levels is described in more detail in the publication by Frederique Crete et al. entitled "The Blur Effect: Perception and Estimation with a New No-Reference Perceptual Blur Metric", Proc. SPIE 6492, Human Vision and Electronic Imaging XII, Feb. 12, 2007. In the case of analog noise measurements, the normalization is for example performed by mapping the level provided by the detector to a well-known PSNR (peak signal to noise ratio). For example, in an image with a relatively standard dynamic range, the just noticeable level could correspond to 45 dB PSNR, and the highest level could correspond to 20 dB PSNR.

Of course, there are many different ways of performing normalization with different levels of sensitivity, and those skilled in the art will know how to select and/or adapt an appropriate normalization technique based on the particular application.

In some embodiments, the confidence levels $C_{A1}$ to $C_{AN}$ are also normalized with respect to each other, as will be described in more detail below.

Artefact correction in the embodiment of FIG. 2 for example takes benefit from positive and/or negative correlation between the presence of different types of artefacts in an image.

For example, the present inventor has found that certain types of artefacts, such as blocking, ringing and blurring, mosquito noise, banding, color blobs and missing blocks generally have a high coexistence in a same image. These artefacts all tend to relate to MPEG type compression. Therefore, a high level of one of these artefacts in the image is a strong indicator that the other artefacts are also likely to be present, whereas a low level of one or these artefacts in the image is a strong indicator that the other artefacts are likely to be absent.

Another example of artefacts that tend to coexist in an image includes those resulting from temporal noise reduction with no vectorial motion compensation, which leads to color comet tails and dirty window effect.

As a further example, artefacts that tend to coexist in an image linked to deinterlaced signals include staircases on moving transitions, aliasing (in French "le repliement de spectre"), combing artefacts, wrong color interpolation and flicker.

Furthermore, artefacts related to motion compensation that tend to coexist in an image include halo effects, blur and luma/chroma incoherencies.

As yet a further example, there tends to be coexistence between artefacts linked to multiexposure systems used for example in HDR (high dynamic range) imaging, due for example to quantization, local contrast adaptation and tone mapping.

The present inventor has also found that other types of artefacts tend to be non-coexisting, or mutually exclusive. As an example, judder (in French "l'effet visuel de saccade") tends to be non-coexisting with halo effects. Indeed, judder tends to be present if there is insufficient or an entire lack of motion compensation. Halo effects tend to result from vectorial motion detection. Therefore, the detected presence of judder in images of a video sequence implies that there are unlikely to be halo effects, and vice versa.

Another example of non-coexisting artefacts is underexposure/overexposure and multi-exposure artefacts. For example, it may not be known whether or not video images have been generated using HDR. However, in the case that multiexposure artefacts are detected, this may indicate that the image is an HDR image, and regions of underexposure and overexposure in the image are desirable and should not be corrected using contrast correction.

Examples of methods for the detection of blocking and ringing in an image, and for generating corresponding confidence levels, will now be described with reference to FIG. 3A. Methods for detecting other types of artefacts in one or more images will be known to those skilled in the art, and will not be described in detail herein.

Figure 3A:
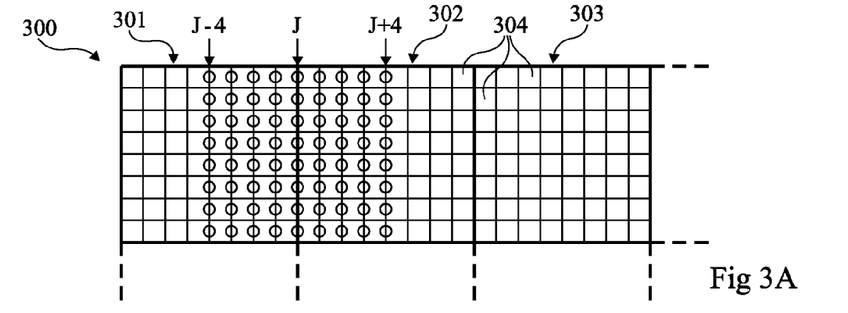
FIG. 3A represents part of an image according to an example embodiment.

FIG. 3A schematically illustrates the top left corner of an image 300 divided into image blocks, three of which are illustrated and labelled 301, 302 and 303 in FIG. 3A. Each image block for example comprises an 8 by 8 block of pixels 304. The size and positioning of the image blocks in the image is for example selected based on the DCT (discrete cosine transform) block size used for the image compression, there being typically four 8 by 8 blocks in a 16 by 16 luma macroblock. Thus in the case that the image has not been scaled after decompression, the blockiness detection is for example performed on these regular 8 by 8 boundaries. However, in the case that the image has been processed after decompression, the blocks may have shifted, and it would be possible to adapt the choice of image blocks accordingly, for example by looking for whether transients tend to be higher at the boundaries of any regular 8 by 8 grid.

Blocking is for example determined by a blockiness measurement that targets blocking artefacts present in flat areas of the image. A flat area is one having relatively uniform pixel values, in other words being low in detail. This is achieved by looking for vertical and horizontal lines with relatively high pixel gradients when compared to gradients of neighboring lines. Extent of blockiness detected in such flat areas can be considered to reflect the overall blockiness in the image, in other words the blockiness in both flat and detailed portions of the image. Furthermore, by targeting flat areas, the algorithm for detecting blockiness can be far simpler than an algorithm that is aimed to be effected in both flat and detailed portions of an image.

The image 300 is considered to be of size N*M, wherein N is the number of lines, and M the number of columns. A field of vertical gradients DiffV(i,j) of size N*(M−1) is for example defined as follows:

$$DiffV(i,j) = abs(P(i,j+1) - P(i,j)) - 1$$

where P(i,j) is the pixel value at position (i,j). Each pixel for example has associated luma and chroma values, and the blockiness measurement is for example based only on luminance values. It is for example assumed that the amount of blockiness detected for the luminance values reflects the amount of blockiness present for chrominance values.

The visibility of vertical block borders is then for example evaluated. In particular, the visibility of a vertical block border at position (I to I+(N0−1), J), where J is the vertical block border and N0 is the vertical block size, is computed by comparing values DiffV on the border, where j=J, to values DiffV on the left side of the border (for j from J−4 to J) and on the right side of the border (for j from J+1 to J+4), based on the following equations:

$$AvDiffLeft(i, J) = \frac{(DiffV(i, J-4) + DiffV(i, J-3) + DiffV(i, J-2) + DiffV(i, J-1))}{4},$$

for i from I to I+(N0-1); and $$AvDiffRight(i, J) = \frac{(DiffV(i, J+4) + DiffV(i, J+3) + DiffV(i, J+2) + DiffV(i, J+1))}{4},$$

for i from I to I+(N0-1).

For example, with reference to FIG. 3A, a vertical border J between the image blocks 301 and 302 is illustrated, with circles between adjacent pixels representing a gradient value associated with each pair of horizontally neighboring pixels. Similar vertical lines of gradient values are shown for the lines J−4, J−3, J−2, J−1, J+1, J+2, J+3 and J+4.

The visibility of the line J is then for example determined as follows:

if DiffV(i,J)>gain*AvDiffLeft(i,J)Or if DiffV(i,J)>gain*AvDiffRight(i,J) then line_visible (i,J)=1 else line_visible(i,J)=0 where gain is a parameter determining a threshold ratio, which is set for example at the value of 2. It can then be determined that:

$$\text{if} \left( \sum_{i=1}^{i=I+N0} linevisible(i,J) > \frac{3*N0}{4} \right) \text{then}$$

$$Diffvisibility(I,J) = \sum_{i=1}^{i=I+N0} DiffV(i,J) \text{ and}$$

$$BlockVisibility(I,J) = 1$$

In other words, if the gradient at column J is classified as visible on more than ¾ of the block height, the block is deemed visible. The vertical blocking in the image can then be calculated as:

BlockV=Σ$_{I,J \text{ over complete image}}$BlockVisibility(I,J)

A similar computation is performed on horizontal gradients, and the overall blockiness is for example determined as BlockV+BlockH.

The confidence level in relation to the blockiness measurement is for example a function of the number of flat blocks detected in the image, and is for example computed as follows. This gives an indication of the number of measurements that are taken in the image in order to evaluate the blockiness.

For each vertical border tested, a vertical flat count FlatCV is determined as:

if($\Sigma_{i=I}^{i=I+N0}$AvDiffLeft(i,J)<TH1) or ($\Sigma_{i=I}^{i=I+N0}$AvDiffRight(i,J)<TH2) then FlatCV(I,J)=1 where TH1 is a threshold value below which the pixels can be considered to be relatively flat.

Similarly, a horizontal flat count FlatCH is determined in a similar manner based on each horizontal border tested, and the overall confidence level $CL_B$ is for example determined as:

$$CL_B = \text{factor} * \sum \frac{FlatCV + FlatCH}{NB}$$

where NB is the total number of blocks in the image, equal for example to N*M/BW*BH, where BW is the block width and BH is the block height.

Ringing detection is for example performed in a similar manner to blocking detection, except that detection is made of echoes of locally large transitions.

The image is divided into blocks of size N1*M1, where N1 is the block height, and M1 is the block width, and the block sizes are not necessarily the same as those chosen for the blocking detection. For example, they may be larger.

For a block starting at (I,J), we define:

MaxDiffV(i,J)=max(DiffV(I+i,J+j))

over j=0 to M1−1, for i from 0 to N1−1, and where DiffV is as defined by equation 1 above.

Furthermore, a maximum transition position is defined as:

MaxTransPos(i,J)=j index of max(DiffV(I+i,J+j))

over j=0 to M1−1, for i from 0 to N1−1. A local reference maximum transition also be defined as follows:

MaxDiffValue(I,J)=$\Sigma_{i=I}^{i=I+N1-1}$MaxDiffV(i,J)

To check whether the line defined by the pixels at position (i, MaxTransPos(i,J)) has a chance of representing a high visible transition, for i going from I to I+N1−1, the variation from pixel to pixel along the line is for example computed as:

$$DiffLineRef(I,J) = \sum_{i=I}^{i=I+N1-2} abs(P(i+1, MaxTransPos(i+1,J)) - P(i, MaxTransPos(i,J)))$$

If DiffLineRef(I,J)<TH2, where TH2 is a threshold for example chosen to equal ¼(N−1)*MaxDiffValue(I,J), then it is considered that the line has a chance of representing a high transition in the image. Indeed, it is expected that there will be some level of uniformity between different points representing a highly visible transition, whereas there will be large gradients across or perpendicular to the transition. Thus the existence of potential echoes is then verified. If this condition is fulfilled, a representative value for this line is for example defined as:

$$ValueLine(I,J) = \frac{1}{N1} * \sum_{i=I}^{i=I+N1-1} P(i, MaxTransPos(i,J))$$

Candidate lines parallel to this one are then defined as:

CandidateTransPos(i,J,k)=MaxTransPos(i,J)+k with k from −EchoWidth to +EchoWidth, where EchoWidth is for example set equal to a few pixels, such as 2 to 5 pixels. The difference from pixel to pixel is then checked for each of the candidate lines and the representative value for each line as follows:

$$DiffLineCand(I,J,k) = \sum_{i=I}^{i=I+N1-2} abs(P(i+1, MaxTransPos(i+1,J)+k) - P(i, MaxTransPos(i,J)+k))$$

If (DiffLineCand(I,J,k)) < TH3), EnableCand(I,J,k) = 1, else 0

$$ValueLineCand(I,J,k) = \frac{1}{N1} * \sum_{i=I}^{i=I+N1-1} P(i, MaxTransPos(i,J)+k$$

A search is made for echoes on the left side of the reference maximum transition, for k=−1 to −EchoWidth, as long as EnableCand(I,J,k)=1. To do this, the evolution of the representative value from the reference transition line to the further candidate line is verified as follows:

DiffValueLineLeft(I,J,k)=ValueLineCand(I,J,k−1)−ValueLineCand(I,J,k)

If DiffValueLineLeft(I,J,k) has a changing sign, then it is considered that there is a risk of an echo transition on the left side. In this case, if DiffValueLineLeft is first negative for k values close to 0, the lowest line is defined as the candidate for which ValueLineCand(I,J,k) is the lowest. This line corresponds to k=klow.

The echo line is the candidate line furthest to the left of the lowest line for which ValueLineCand(I,J,k) is the highest. This line corresponds to k=khigh. The amount of echo is for example defined as:

$$EchoLeft(I, J) = \frac{abs(ValueLine(I, J, khigh) - ValueLine(I, J, klow))}{abs(ValueLine(I, J, 0) - ValueLine(I, J, klow))}$$

If DiffValueLineLeft is first positive for k values close to 0, the highest line is for example defined as the candidate for which ValueLineCand(I,J,k) is the highest. This line corresponds to k=khigh. The echo line is the candidate line furthest to the left of the highest line for which ValueLineCand(I,J,k) is the lowest. This line corresponds to k=klow. The amount of echo is for example defined as:

$$EchoLeft(I, J) = \frac{abs(ValueLine(I, J, klow) - ValueLine(I, J, khigh))}{abs(ValueLine(I, J, 0) - ValueLine(I, J, khigh))}$$

A similar computation is for example performed to search for echoes on the right side of the reference maximum transition, leading to a value EchoRight(I,J). The final echo value Echo(I,J) is for example equal to max(EchoLeft(I,J), EchoRight(I,J)).

The ringing level over the whole image for example corresponds to an accumulation of the local echo measurements as follows:

Ringing=ΣEcho(I,J)

A confidence level for the ringing value is for example based on the number of transitions taken into account for the computation of ringing, the higher the number, the higher the confidence. For each block starting at (I,J), the local confidence Confidence(I,J) is for example computed as:

$$AveAroundTransLeft = \sum_{k=-EchoWidth/2}^{k=-1} ValuelineCand(I, J, k)$$

$$ConfidenceLeft(I, J) = \frac{abs(ValueLineCand(I, J, 0) - AveAroundTransLeft(I, J))}{ValueLineCand(I, J, 0)}$$

$$AveAroundTransRight = \sum_{k=1}^{k=EchoWidth} ValuelineCand(I, J, k)$$

$$ConfidenceRight(I, J) = \frac{abs(ValueLineCand(I, J, 0) - AveAroundTransRight(I, J))}{ValueLineCand(I, J, 0)}$$

Confidence(I, J) = max(ConfidenceLeft(I, J), ConfidenceRight(I, J))

The overall confidence level $CL_R$ associated with the ringing level is for example defined as:

$$CL_R = factor * \sum_{over\ whole\ image} \frac{Confidence(I, J)}{NB}$$

where NB is the total number of blocks in the image. The value of factor is for example chosen in order to normalize the confidence level to a scale of 0 to 1, and is for example equal to 100 in one embodiment.

Figure 3B:
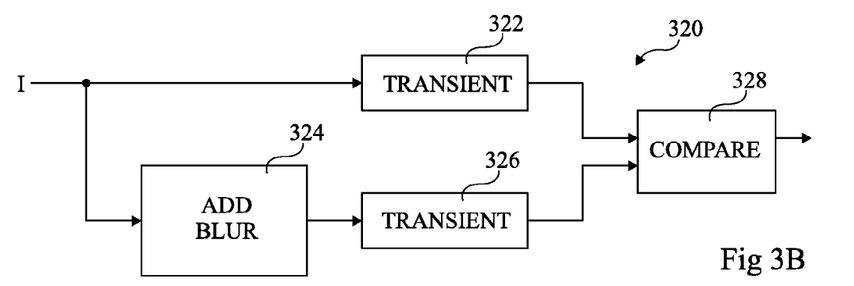
FIG. 3B is a block diagram illustrating functional elements in a blurring detection module according to an example embodiment.

FIG. 3B is a block diagram illustrating an example of a system 320 for detecting blurring in an input video image I.

The sharpness of an input image I is for example determined based on transient detection performed by a block 322 (TRANSIENT). For example, this involves determining vertical gradients using equation 1 above, and determining horizontal gradients in a similar manner.

Blur is also for example added to the input image by a block 324, which for example corresponds to applying a low-pass Gaussian filter to the image. A block 326 (TRANSIENT) then detects transients in the blurred image provided by block 324. The transients generated by blocks 322 and 326 are then compared by a block 328. Depending on the extent to which the addition of blur to the image by block 324 reduces the number of detected transients, the original level of sharpness can be determined. Indeed, the number of transients in an image that already lacks sharpness would be substantially the same as in the same image after blur has been added.

A confidence level associated with the blurring measure is for example based on the number of transients present in the input image. Indeed, for an image with few transients, it will be difficult to know whether it is extremely blurred or whether it is simply an image without edges and lines. The confidence level is therefore for example determined by performing the following operation:

If$(DiffV(i, j) > Thresh * max(DiffV(i, j))$, then increment count $$Blurring\ Confidence\ Level = \frac{factor * Count}{NB}$$

The value of factor is for example chosen to normalize the confidence level to a value between 0 and 1, and is for example set to a value of 10000.

Figure 4:
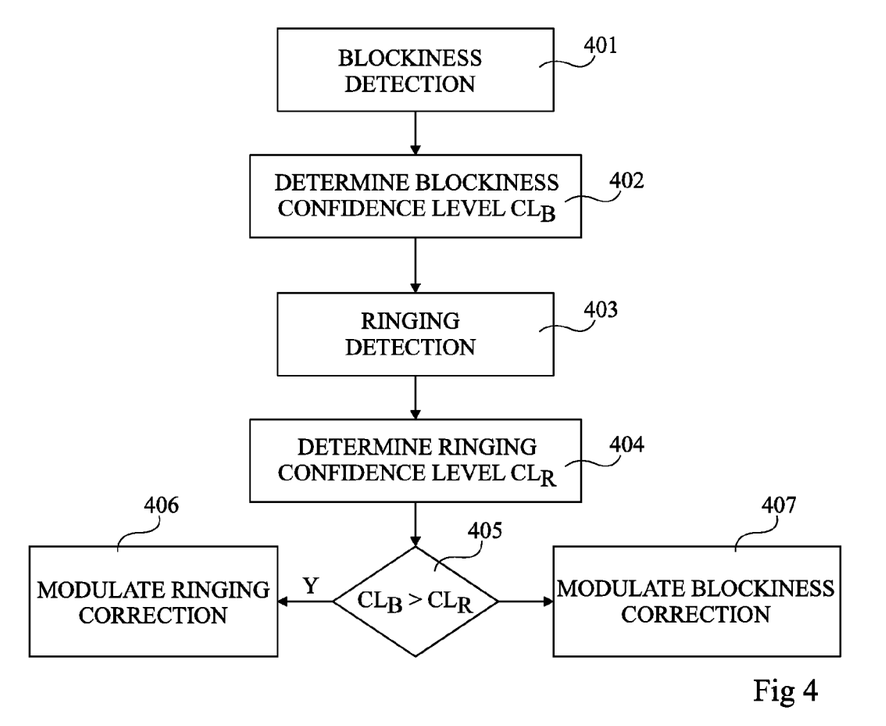
FIG. 4 is a flow diagram illustrating operations in a method of artefact detection and correction according to an example embodiment of the present disclosure.

FIG. 4 is a flow diagram illustrating the steps of performing artefact correction according to an example in which the detected artefacts are blockiness and ringing. Of course, in some embodiments, this method could be applied to other types of artefacts.

In a first operation 401, blockiness detection is performed on one or more input images, for example according to the method described above.

In a subsequent operation 402, a confidence level $CL_B$ related to blockiness detection is determined, for example according to the method described above.

In a subsequent operation 403, ringing detection is performed on the one or more input images, for example according to the method described above.

In a subsequent operation 404, a confidence level $CL_R$ associated with the ringing in the image is determined, also for example according to the method described above. While the operations 403 and 404 are shown as being implemented after the operations 401 and 402, in embodiments, they could be performed before or in parallel with operations 401 and 402.

In a subsequent operation 405, the confidence levels $CL_B$ and $CL_R$ are compared with each other.

If the confidence level $CL_B$ is greater than the confidence level $CL_R$, the next operation is 406, in which the ringing correction is modulated based on the detected level of blockiness. In particular, the gain value determined for the ringing correction is for example modified based on a difference between the normalized values of the ringing and blocking gain values. The gain level used for the blocking correction for example remains unmodified.

Alternatively, if the confidence level $CL_B$ is lower than the confidence level $CL_R$, the next operation is 407, in which the blocking correction is modulated based on the detected level of ringing. In particular, the gain value determined for the blocking correction is for example modified based on a difference between the normalized values of the ringing and blocking gain values. The gain level used for the ringing correction for example remains unmodified.

Figure 5:
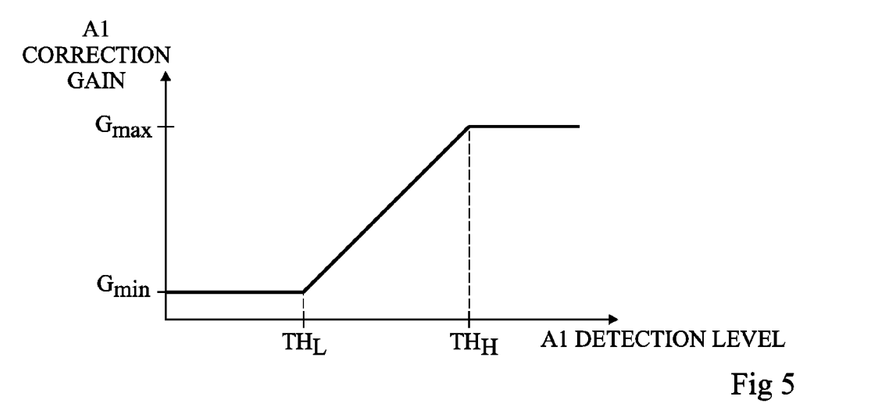
FIG. 5 is a graph illustrating an example of the generation of the gain values for a first type of artefact according to an example embodiment.

FIG. 5 is a graph illustrating an example of how a gain value is generated for the correction of an artefact A1, based on a detected level of the artefact A1 in an image.

If the detected level is lower than a lower threshold $TH_L$, the correction of artefact A1 is for example performed based on a minimum gain level $G_{min}$, which could be at zero, implying that no correction is performed. Between the lower threshold $TH_L$ and a higher threshold $TH_H$, the gain is for example linearly proportional to the detected level of artefact A1. Above the higher threshold $TH_H$, the gain is for example set to a maximum gain value $G_{max}$. For example, assuming that the amount of correction performed by the correction algorithm is controlled by a digital value of a certain bit length, the maximum gain value $G_{max}$ is for example the maximum possible value of this digital value.

Figure 6:
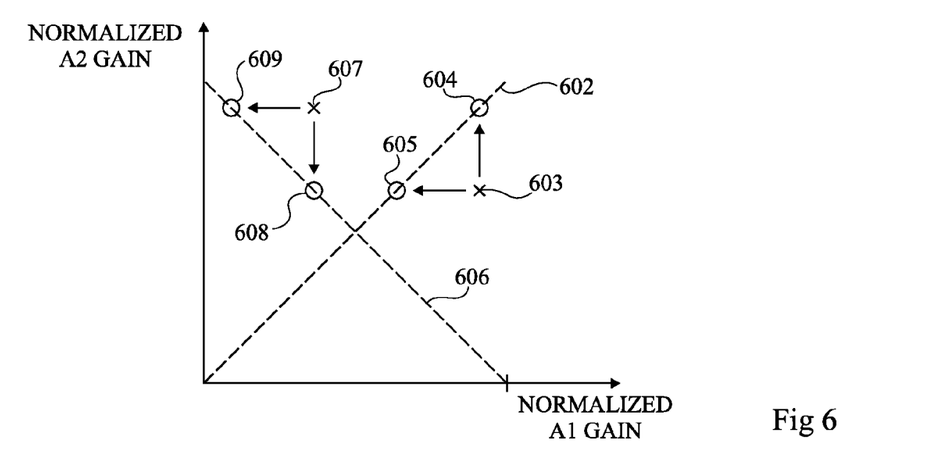
FIG. 6 is a graph illustrating examples of the modification of artefact gain values according to an example embodiment of the present disclosure.

FIG. 6 is a graph showing examples of how the gain for the correction of artefacts A1 and A2 may be modulated. First, if appropriate, the gain values are normalized, for example to both be in a range of 0 to 1.

In the case that the artefacts A1 and A2 have relatively strong coexistence, a dashed line 602 corresponding to y=x represents where each plot of the A1 gain against the A2 gain can be made to fall. A cross 603 illustrates an example in which the plotted gains fall below the dashed line 602.

In the case that the confidence level associated with artefact A1 is higher than the level associated with artefact A2, the gain value of A1 for example remains unchanged, and the gain value of A2 is for example increased towards a point on the dashed line 602 shown by a circle 604 in FIG. 6. In some embodiments the gain value of A2 is increased at most to a point halfway between the cross 603 and the point shown by the circle 604.

Alternatively, in the case that the confidence level associated with artefact A2 is higher than the level associated with artefact A1, the gain value of A2 for example remains unchanged, and the gain value of A1 is for example decreased towards a point on the dashed line 602 shown by a circle 605 in FIG. 6. In some embodiments the gain value of A1 is decreased at most to a point halfway between the cross 603 and the point shown by the circle 605.

For example, in the case that there is coexistence between the artefacts A1 and A2, the modified gain value for A1 may be determined based on the following equation:

$$G_{A1}=G_{A1}+I_{Factor}*(G_{A2}-G_{A1})$$

where $G_{A1}$ and $G_{A2}$ are the normalized first and second gain values and $I_{Factor}$ is an influence factor determined based on the following equation:

$$I_{Factor}=\frac{1}{2}*(C_{A2}-C_{A1})/(C_{A2}+C_{A1})$$

where $C_{A1}$ is the first confidence level and $C_{A2}$ is the second confidence level. $I_{Factor}$ is for example limited to positive values, for example by setting $I_{Factor}$ to zero if $C_{A1}$ is greater than or equal to $C_{A2}$.

In the case that the artefacts A1 and A2 have relatively strong non-coexistence, a dashed line 606 corresponding to y=−x+1 represents where each plot of the A1 gain against the A2 gain can be made to fall. A cross 607 illustrates an example in which the plotted gains fall above the dashed line 606.

In the case that the confidence level associated with artefact A1 is higher than the level associated with artefact A2, the gain value of A1 for example remains unchanged, and the gain value of A2 is for example decreased towards a point on the dashed line 606 shown by a circle 608 in FIG. 6. In some embodiments the gain value of A2 is decreased at most to a point halfway between the cross 607 and the point shown by the circle 608.

Alternatively, in the case that the confidence level associated with artefact A2 is higher than the level associated with artefact A1, the gain value of A2 for example remains unchanged, and the gain value of A1 is for example decreased towards a point on the dashed line 606 shown by a circle 609 in FIG. 6. In some embodiments the gain value of A1 is decreased at most to a point halfway between the cross 607 and the point shown by the circle 609.

For example, in the case that the artefacts A1 and A2 are exclusive, the modified gain value for A1 may be for example determined based on the following equation:

$$G_{A1}=G_{A1}+I_{Factor}*(1-G_{A2}-G_{A1})$$

where again $G_{A1}$ and $G_{A2}$ are the normalized first and second gain values and $I_{Factor}$ is the same as defined above for coexisting artefacts.

Figure 7:
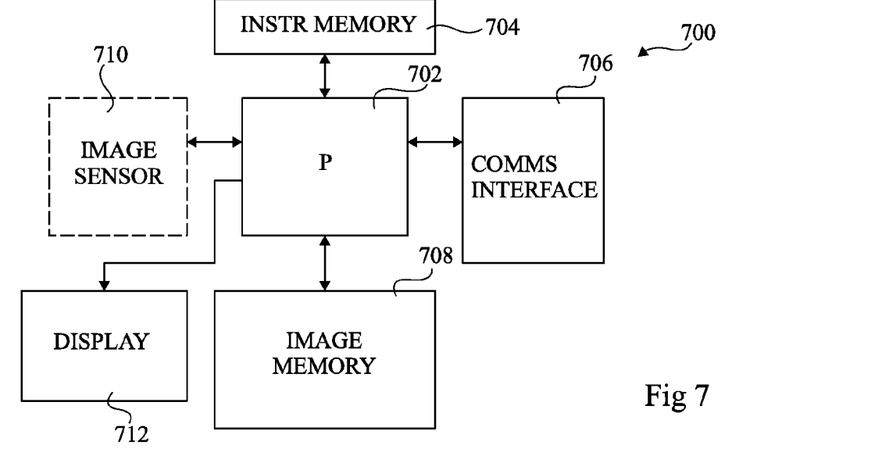
FIG. 7 is a block diagram schematically illustrating an image correction device according to an example embodiment of the present disclosure.

FIG. 7 illustrates an image correction device 700 comprising a processing device 702 under the control of instructions stored in an instruction memory 704. The processing device 702 is further coupled to an image memory 708, which for example stores one or more still images and/or images of a video sequence that are to be corrected. The instructions stored in the instruction memory 704 for example cause the processor 702 to implement the artefact detection and correction methods described above in relation to FIGS. 2, 3A, 3B and 4.

The processor 702 is also for example coupled to a communications interface 706. In some embodiments the device 700 is also an image capturing device, and comprises an image sensor 710 for capturing still images and/or images forming a video sequence. Furthermore, a display 712 is optionally provided for displaying corrected images.

An embodiment of an artefact detection and correction method or device may facilitate performance in a simplified fashion, and may reduce chip area and/or processing resources used when compared to prior art implementations.

Having thus described at least one illustrative embodiment, various alterations, modifications and improvements will readily occur to those skilled in the art.

For example, it will be apparent to those skilled in the art that, while certain examples have been provided describing how artefact correction can be adjusted by modifying gain values based on confidence levels of several measured artefacts, there are various alternative techniques that could be used to adjust the artefact correction.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   detecting, using digital image processing circuitry, a first type of artefact in one or more images;
   generating, using the digital image processing circuitry, a first artefact value and a first confidence level associated with the first type of artefact;
   detecting, using the digital image processing circuitry, a second type of artefact in the one or more images;
   generating, using the digital image processing circuitry, a second artefact value and a second confidence level associated with the second type of artefact; and
   performing, using the digital image processing circuitry, correction of the first type of artefact in the one or more images based on the first and second artefact values and relative values of the first and second confidence levels.

2. The method of claim 1 wherein the first and second artefact values are normalized with respect to each other, and the first and second confidence levels are normalized with respect to each other.

3. The method of claim 1, comprising performing correction of the second type of artefact in the one or more images based on the first and second artefact values and the relative values of the first and second confidence levels.

4. The method of claim 1 wherein performing correction of the first type of artefact comprises:
   comparing the first and second confidence levels;
   if the second confidence level is greater than the first confidence level, modifying the first artefact value based on the second artefact value and performing correction of the first type of artefact based on the modified first artefact value; and
   if the first confidence level is greater than the second confidence level, performing correction of the first type of artefact based on the first artefact value.

5. The method of claim 1 wherein the first and second artefact values are gain values, and performing correction of the first type of artefact comprises:
   modifying the first artefact gain value based on the second artefact gain value and the relative values of the first and second confidence levels; and
   applying the modified first gain value during an artefact correction process.

6. The method of claim 5 wherein the modified first artefact gain value is determined based on one of the following equations:

$$G_{A1}=G_{A1}+I_{Factor}*(G_{A2}-G_{A1}); \text{ and}$$

$$G_{A1}=G_{A1}+I_{Factor}*(1-G_{A2}-G_{A1})$$

where $G_{A1}$ and $G_{A2}$ are normalized first and second gain values and $I_{Factor}$ is an influence factor determined based on the following equation:

$$I_{Factor}=\tfrac{1}{2}*(C_{A2}-C_{A1})/(C_{A2}+C_{A1})$$

where $C_{A1}$ is the first confidence level and $C_{A2}$ is the second confidence level and wherein $I_{Factor}$ is limited to positive values.

7. The method of claim 1 wherein the first artefact type is a blocking type, and the second artefact type is one of a ringing, blurring, mosquito noise, banding, color blobs and missing blocks artefact type.

8. The method of claim 7 wherein generating the level of confidence of the first artefact type comprises:
   determining pixel gradients between neighboring pixels across a whole image; and
   comparing pixels gradients of a first line of pixels with an average pixel gradient of neighboring lines of pixels.

9. The method of claim 1 wherein the first confidence level is generated based on a density of the first type of artefact detected in the one or more images, and the second confidence level is generated based on a density of the second type of artefact detected in the one or more images.

10. The method of claim 1 wherein the first type of artefact is a compression artefact.

11. The method of claim 1 wherein the one or more images are part of an image sequence, and at least one of the first and second types of artefacts is a video compression artefact.

12. A device, comprising:
   one or more memories;
   image processing circuitry, which, in operation:
      generates a first artefact value and a first confidence level associated with a first type of artefact in an image;
      generates a second artefact value and a second confidence level associated with a second type of artefact in an image; and
      performs correction of the first type of artefact in the image based on the first and second artefact values and relative values of the first and second confidence levels.

13. The device of claim 12 wherein the first and second artefact values are normalized with respect to each other, and the first and second confidence levels are normalized with respect to each other.

14. The device of claim 12 wherein the image processing circuitry, in operation performs correction of the second type of artefact in the image based on the first and second artefact values and the relative values of the first and second confidence levels.

15. The device of claim 12 wherein the image processing circuitry, in operation, performs correction of the first type of artefact by:
comparing the first and second confidence levels;
if the second confidence level is greater than the first confidence level, modifying the first artefact value based on the second artefact value and performing correction of the first type of artefact based on the modified first artefact value; and
if the first confidence level is greater than the second confidence level, performing correction of the first type of artefact based on the first artefact value.

16. The device of claim 12 wherein the first and second artefact values are gain values, and performing correction of the first type of artefact comprises:
modifying the first artefact gain value based on the second artefact gain value and the relative values of the first and second confidence levels; and
applying the modified first gain value during an artefact correction process.

17. The device of claim 12 wherein the modified first artefact gain value is determined based on one of the following equations:

$$G_{A1}=G_{A1}+I_{Factor}*(G_{A2}-G_{A1}); \text{ and}$$

$$G_{A1}=G_{A1}+I_{Factor}*(1-G_{A2}-G_{A1})$$

where $G_{A1}$ and $G_{A2}$ are normalized first and second gain values and $I_{Factor}$ is an influence factor determined based on the following equation:

$$I_{Factor}=\frac{1}{2}-(C_{A2}-C_{A1})/(C_{A2}+C_{A1})$$

where $C_{A1}$ is the first confidence level and $C_{A2}$ is the second confidence level and wherein $I_{Factor}$ is limited to positive values.

18. The device of claim 12 wherein the image processing circuitry, in operation, generates the level of confidence of the first artefact type by:
determining pixel gradients between neighboring pixels across the whole image; and
comparing pixels gradients of a first line of pixels with an average pixel gradient of neighboring lines of pixels.

19. The device of claim 12 wherein the image processing circuitry, in operation, generates the first confidence level based on a density of artefacts detected in the images.

20. The device of claim 12 wherein the image processing circuitry, in operation, processes one or more images of an image sequence.

21. A non-transitory computer-readable medium having contents which configure an image processing device to perform a method, the method comprising:
generating a first artefact value and a first confidence level associated with a first type of artefact in one or more images;
generating a second artefact value and a second confidence level associated with a second type of artefact in the one or more image; and
performing correction of the first type of artefact in the one or more images based on the first and second artefact values and relative values of the first and second confidence levels.

22. The medium of claim 21 wherein the method comprises performing correction of the second type of artefact in the one or more images based on the first and second artefact values and the relative values of the first and second confidence levels.

23. The medium of claim 21 wherein the method comprises performing correction of the first type of artefact by:
comparing the first and second confidence levels;
if the second confidence level is greater than the first confidence level, modifying the first artefact value based on the second artefact value and performing correction of the first type of artefact based on the modified first artefact value; and
if the first confidence level is greater than the second confidence level, performing correction of the first type of artefact based on the first artefact value.

24. A system, comprising:
an image memory;
an image display; and
image processing circuitry, which, in operation:
generates a first artefact value and a first confidence level associated with a first type of artefact in one or more images;
generates a second artefact value and a second confidence level associated with a second type of artefact in the one or more images; and
performs correction of the first type of artefact in the one or more images based on the first and second artefact values and relative values of the first and second confidence levels.

25. The system of claim 24, comprising an instruction memory, wherein the image processing circuitry includes a processor configured to execute instructions stored in the instruction memory.

26. The system of claim 24, comprising an image sensor.

27. The device of claim 12 wherein the first confidence level is associated with a presence of the first type of artifact and the second confidence level is associated with a presence of the second type of artifact.

28. The method of claim 1 wherein the first confidence level is associated with a presence of the first type of artifact and the second confidence level is associated with a presence of the second type of artifact.

* * * * *

UNITED STATES PATENT AND TRADEMARK OFFICE
CERTIFICATE OF CORRECTION

PATENT NO. : 9,639,919 B2
APPLICATION NO. : 14/863993
DATED : May 2, 2017
INVENTOR(S) : Marina Nicolas It is certified that error appears in the above-identified patent and that said Letters Patent is hereby corrected as shown below:

Item (57):
"A method involving: detecting in an image a first type of artifact (A1) to generate a first artifact value ($G_{A1}$) and a first confidence level ($C_{A1}$); detecting in the image a second type of artifact (A2) to generate a second artifact value ($G_{A2}$) and a second confidence level ($C_{A2}$); and performing correction of the first type of artifact (A1) in the image based on the first and second artifact values ($G_{A1}$, $G_{A2}$) and the relative values of the first and second confidence levels ($C_{A1}$, $C_{A2}$)." should read, --A method involving: detecting in an image a first type of artefact (A1) to generate a first artefact value ($G_{A1}$) and a first confidence level ($C_{A1}$); detecting in the image a second type of artefact (A2) to generate a second artefact value ($G_{A2}$) and a second confidence level ($C_{A2}$); and performing correction of the first type of artefact (A1) in the image based on the first and second artefact values ($G_{A1}$, $G_{A2}$) and the relative values of the first and second confidence levels ($C_{A1}$, $C_{A2}$).--.

Column 17, Line 35:
" $I_{Factor} = \frac{1}{2} - (C_{A2} - C_{A1})/(C_{A2} + C_{A1})$ ," should read, -- $I_{Factor} = \frac{1}{2} * (C_{A2} - C_{A1})/(C_{A2} + C_{A1})$ --.

Signed and Sealed this
Third Day of October, 2017

Joseph Matal
*Performing the Functions and Duties of the*
*Under Secretary of Commerce for Intellectual Property and*
*Director of the United States Patent and Trademark Office*